US009098871B2

(12) United States Patent
Argue et al.

(10) Patent No.: US 9,098,871 B2
(45) Date of Patent: Aug. 4, 2015

(54) METHOD AND SYSTEM FOR AUTOMATICALLY MANAGING AN ELECTRONIC SHOPPING LIST

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 143 days.

(21) Appl. No.: 13/756,352

(22) Filed: Jan. 31, 2013

(65) Prior Publication Data
US 2014/0214601 A1 Jul. 31, 2014

(51) Int. Cl.
G06Q 30/06 (2012.01)
G06T 7/00 (2006.01)

(52) U.S. Cl.
CPC .............. G06Q 30/0633 (2013.01); G06T 7/00 (2013.01)

(58) Field of Classification Search
CPC .............. G06Q 30/0601–30/0645; G06T 7/00
USPC ................................. 705/26.1–27.2
See application file for complete search history.

(56) References Cited

U.S. PATENT DOCUMENTS

| 6,619,546 | B1 | 9/2003 | Nguyen | |
|---|---|---|---|---|
| 6,910,697 | B2 | 6/2005 | Varatharajah | |
| 6,997,382 | B1 | 2/2006 | Bhri | |
| 7,150,395 | B1 | 12/2006 | White | |
| 7,168,618 | B2 * | 1/2007 | Schwartz | 235/383 |
| 7,337,960 | B2 | 3/2008 | Ostrowski | |
| 7,934,647 | B1 * | 5/2011 | Mims et al. | 235/383 |
| 8,015,076 | B2 | 9/2011 | Owens | |
| 8,196,822 | B2 | 6/2012 | Goncalves | |
| 8,239,276 | B2 | 8/2012 | Lin | |
| 2002/0061134 | A1 * | 5/2002 | Cofer et al. | 382/181 |
| 2002/0194075 | A1 * | 12/2002 | O'Hagan et al. | 705/21 |
| 2006/0293968 | A1 * | 12/2006 | Brice et al. | 705/26 |
| 2010/0158310 | A1 * | 6/2010 | McQueen et al. | 382/100 |
| 2010/0253787 | A1 * | 10/2010 | Grant | 348/207.1 |
| 2010/0262554 | A1 * | 10/2010 | Elliott | 705/323 |
| 2011/0036907 | A1 * | 2/2011 | Connelly | 235/383 |
| 2012/0050144 | A1 * | 3/2012 | Morlock | 345/8 |
| 2012/0253905 | A1 | 10/2012 | Darragh | |
| 2012/0296751 | A1 * | 11/2012 | Napper | 705/23 |

OTHER PUBLICATIONS

Vibert-Kennedy. Smart shopping carts to roam grocery stores of future, USA Today. Oct. 26, 2003 (saved as 13756352 USATODAY).*

(Continued)

Primary Examiner — Yogesh C. Garg
Assistant Examiner — Lindsey Smith
(74) Attorney, Agent, or Firm — Howard & Howard Attorneys PLLC

(57) ABSTRACT

A computer-implemented method is disclosed herein. The method includes the step of receiving, with a processing device of a commerce server, one or more shopping list signals from an electronic computing device to establish a shopping list of a plurality of items offered for sale in a retail store. The method also includes the step of receiving, with the processing device, one or more signals from an augmented reality device worn by a consumer as the consumer shops in the retail store. The method also includes the step of determining, with the processing device, that an item from the shopping list has been placed in a shopping container from the one or more signals received from the augmented reality device. The method also includes the step of modifying, with the processing device, the shopping list in response to said determining step.

15 Claims, 6 Drawing Sheets

(56) References Cited

OTHER PUBLICATIONS

Bishop, Todd. Whole Foods prototype puts Kinect on shopping cart, follows people around store, Geek Wire. Feb. 27, 2012 (saved as Whole Foods prototype puts Kinect on shopping cart, follows people around store—GeekWire).*

IBM. Shop & Save grocery drives sales and boosts customer loyalty with IBM Personal Shopping Assistant. Dec. 2004. (saved as 13756352 IBM).*

* cited by examiner

METHOD AND SYSTEM FOR AUTOMATICALLY MANAGING AN ELECTRONIC SHOPPING LIST

BACKGROUND INFORMATION

1. Field of the Disclosure

The present invention relates generally to providing a shopping list to a consumer that can be created electronically. In particular, a consumer can create a shopping list electronically and the electronic shopping list can be automatically updated in response to one or more signals that are transmitted through an augmented reality device worn by the consumer.

2. Background

Some retail stores extend across tens of thousands of square feet and offer thousands of items for sale. Many consumers visit such retail stores when shopping for a diverse set of items such as groceries, office supplies, and household wares. Typically, these stores can have dozens of aisles and/or departments. Accordingly, traversing these aisles looking for specific items may be a challenging experience. Shopping lists can assist a consumer in focusing on the items to purchase, to complete a shopping trip successfully and efficiently. However, shopping lists can be difficult to manage while the consumer is traversing the store looking for items and avoiding other consumers. The consumer often needs to grasp and consider items, making it difficult to maintain the shopping list in-hand and even more difficult to maintain both the shopping list and a writing instrument in-hand.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
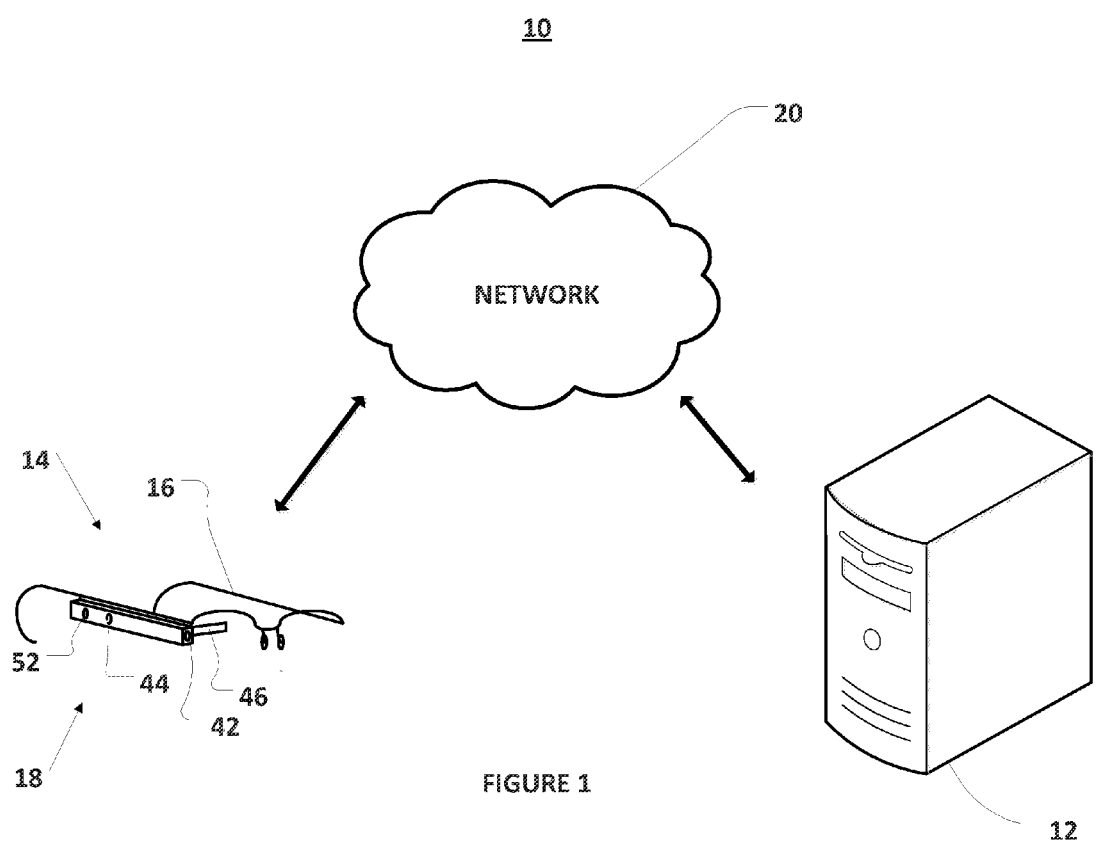
FIG. 1 is an example schematic illustrating a system according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist a consumer shopping in a retail store. An embodiment of the present disclosure can assist a consumer in managing a shopping list to help the consumer shop more efficiently. An embodiment of the present disclosure can help reduce the stress that can arise while keeping track of items purchased and items acquired, and thus make the shopping trip more enjoyable.

A shopping list management system according to some embodiments of the present disclosure can be operable to receive one or more shopping list signals from an electronic computing device in order to establish a shopping list for a consumer. A shopping list can include a plurality of items that are offered for sale in a retail store. The shopping list can be completed and transmitted to a commerce server of the shopping list management system. The shopping list can be transmitted as a single shopping list signal, wherein a "single" shopping list signal contains the identities of a plurality of items. Alternatively, the shopping list can be established item-by-item with a plurality of shopping list signals, wherein each item is individually communicated in a shopping list signal to the commerce server.

The shopping list can be generated with an electronic computing device possessed by the consumer. An electronic computing device used by a consumer can be a laptop computer, a desktop computer, a smart-phone, a tablet, an e-reader, or any other electronic computing device operable to generate and transmit a shopping list signal.

A shopping list management system according to some embodiments of the present disclosure can be operable to receive signals from an augmented reality device worn by a consumer as the consumer shops in the retail store. The one or more signals can contain information that indicates that the consumer has placed one of the items on the shopping list in a shopping container such as a shopping cart or basket. For example, in some embodiments of the disclosure, a video signal can be transmitted from the augmented reality device and received by a commerce server. The video signal can contain one or more frames in which a consumer's hand is visible placing an item in a shopping container, wherein the item is an item on the shopping list.

In some embodiments of the present disclosure, other signals generated by the augmented reality device can be analyzed to complement the analysis of a video signal. For example, an augmented reality device can be configured to transmit signals indicative of the consumer's position within a retail store and also the orientation of the consumer's head. The position signal can be assessed in conjunction with the video signal to confirm the identity of the item being placed in the shopping container; the item detected in the video signal should be an item proximate to the position of the consumer that is indicated by the position signal. The orientation signal can be assessed in conjunction with the video signal to confirm the identity of the item being placed in the shopping container; the item detected in the video signal should be an item disposed on a shelf consistent with the orientation of the consumer's head when the video signal was captured.

A shopping list management system according to some embodiments of the present disclosure can be operable to modify the shopping list when it is determined that the consumer has placed an item from the shopping list into a shopping container. In some embodiments of the present disclosure, the modification of the shopping list occurs automatically. For example, a shopping list management system can remove the item placed in the shopping container from the shopping list without requiring an additional command or prompt from the consumer.

Embodiments of the present disclosure provide numerous benefits to consumers. Embodiments of the present disclosure allow a consumer to execute a shopping list while freeing the consumer's hands for other purposes. Also, in some embodiments of the present disclosure, the shopping list can be manipulated without speaking. A retail store can include numerous consumers speaking and other sources of noise that can compromise the effectiveness of a shopping list manipulated through voice commands. Some embodiments of the present disclosure can allow the consumer to manage a shopping list without communicating commands verbally.

FIG. 1 is a schematic illustrating a shopping list management system 10 according to some embodiments of the present disclosure. The shopping list management system 10 can implement a computer-implemented method that includes the step of receiving, with a commerce server 12, one or more shopping list signals from a consumer. A single shopping list signal can contain a shopping list. A shopping list can be a plurality of items offered for sale at a retail store that the consumer intends to purchase. Alternatively, a shopping list can be created item-by-item, wherein an individual signal for each item is communicated to the commerce server 12 and the commerce server 12 aggregates the items into a shopping list.

The one or more shopping list signals can be communicated to the commerce server 12 with an electronic computing device possessed by the consumer. The one or more shopping list signals can be communicated from a location that is remote from the retail store or that is within the retail store. The one or more shopping list signals can also be communicated from a kiosk located within the retail store, wherein the kiosk houses an electronic computing device. "Kiosk" can thus be defined in a non-dictionary definition manner. The one or more shopping list signals can also be communicated with an augmented reality device worn by the consumer, such as a head mountable unit 14.

The head mountable unit 14 can be worn by a consumer while the consumer is shopping within the retail store. In the illustrated embodiment of FIG. 1, the exemplary head mountable unit 14 includes a frame 16 and a communications unit 18 supported on the frame 16.

Signals transmitted by the head mountable unit 14 and received by the commerce server 12, and vice-versa, can be communicated over a network 20. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

The head mountable unit 14 can transmit one or more signals to the commerce server 12 over the network 20. A video signal can be generated by a camera 42 of the head mountable unit 14 and transmitted to the commerce server 12. The video signal can capture a field of view aligned with the consumer's field of view. Thus, the commerce server 12 can "see" what the consumer sees. The commerce server 12 can detect when an item is placed in a shopping container when the consumer is viewing the placement of an item in the shopping container. When the commerce server 12 detects that an item has been placed in a shopping container, the commerce server 12 can remove that item from the consumer's shopping list. The consumer could build the shopping list through the head mountable unit 14. For example, the consumer might state "create shopping list, add milk, add eggs, add cheese, add bread." In this case, the list could be stored locally and accessed locally when being executed.

Figure 2:
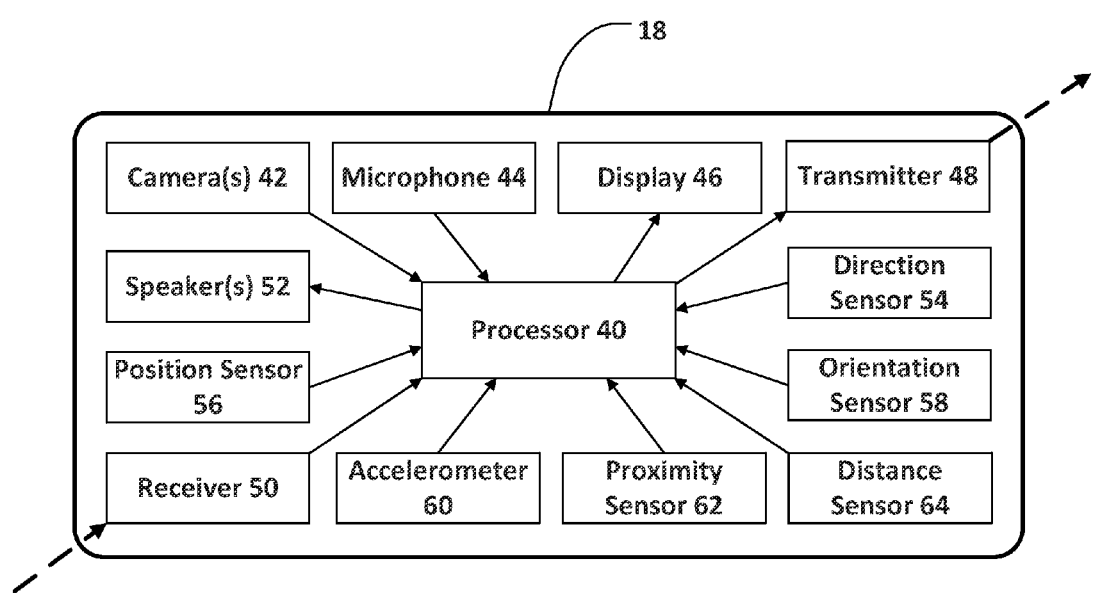
FIG. 2 is an example block diagram illustrating an augmented reality device unit that can be applied in some embodiments of the present disclosure.

FIG. 2 is a block diagram illustrating exemplary components of the communications unit 18. The communications unit 18 can include a processor 40, one or more cameras 42, a microphone 44, a display 46, a transmitter 48, a receiver 50, one or more speakers 52, a direction sensor 54, a position sensor 56, an orientation sensor 58, an accelerometer 60, a proximity sensor 62, and a distance sensor 64.

The processor 40 can be operable to receive signals generated by the other components of the communications unit 18. The processor 40 can also be operable to control the other components of the communications unit 18. The processor 40 can also be operable to process signals received by the head mount unit 14. While one processor 40 is illustrated, it should be appreciated that the term "processor" can include two or more processors that operate in an individual or distributed manner.

The head mount unit 14 can include one or more cameras 42. Each camera 42 can be configured to generate a video signal. One of the cameras 42 can be oriented to generate a video signal that approximates the field of view of the consumer wearing the head mountable unit 14. Each camera 42 can be operable to capture single images and/or video and to generate a video signal based thereon. The video signal may be representative of the field of view of the consumer wearing the head mountable unit 14.

In some embodiments of the disclosure, cameras 42 may be a plurality of forward-facing cameras 42. The cameras 42 can be a stereo camera with two or more lenses with a separate image sensor or film frame for each lens. This arrangement allows the camera to simulate human binocular vision and thus capture three-dimensional images. This process is known as stereo photography. The cameras 42 can be configured to execute computer stereo vision in which three-dimensional information is extracted from digital images. In such embodiments, the orientation of the cameras 42 can be known and the respective video signals can be processed to triangulate an object with both video signals. This processing can be applied to determine the distance that the consumer is spaced from the object. Determining the distance that the consumer is spaced from the object can be executed by the processor 40 or by the commerce server 12 using known distance calculation techniques.

Processing of the one or more, forward-facing video signals can also be applied to determine the identity of the object. Determining the identity of the object, such as the identity of an item in the retail store, can be executed by the processor 40 or by the commerce server 12. If the processing is executed by the commerce server 12, the processor 40 can modify the video signals limit the transmission of data back to the commerce server 12. For example, the video signal can be parsed and one or more image files can be transmitted to the commerce server 12 instead of a live video feed. Further, the video can be modified from color to black and white to further reduce transmission load and/or ease the burden of processing for either the processor 40 or the commerce server 12. Also, the video can cropped to an area of interest to reduce the transmission of data to the commerce server 12.

In some embodiments of the present disclosure, the cameras 42 can include one or more inwardly-facing camera 42 directed toward the consumer's eyes. A video signal revealing the consumer's eyes can be processed using eye tracking techniques to determine the direction that the consumer is viewing. In one example, a video signal from an inwardly-facing camera can be correlated with one or more forward-facing video signals to determine the object the consumer is viewing.

The microphone 44 can be configured to generate an audio signal that corresponds to sound generated by and/or proximate to the consumer. The audio signal can be processed by the processor 40 or by the commerce server 12. For example, verbal signals can be processed by the commerce server 12 such as "this item appears interesting." Such audio signals can be correlated to the video recording.

The display 46 can be positioned within the consumer's field of view. Video content can be shown to the consumer with the display 46. The display 52 can be configured to display text, graphics, images, illustrations and any other video signals to the consumer. The display 46 can be transparent when not in use and partially transparent when in use to minimize the obstruction of the consumer's field of view through the display 46.

The transmitter 48 can be configured to transmit signals generated by the other components of the communications unit 18 from the head mountable unit 14. The processor 40 can direct signals generated by components of the communications unit 18 to the commerce sever 12 through the transmitter 48. The transmitter 48 can be an electrical communication element within the processor 40. In one example, the processor 40 is operable to direct the video and audio signals to the transmitter 40 and the transmitter 48 is operable to transmit the video signal and/or audio signal from the head mountable unit 14, such as to the commerce server 12 through the network 20.

The receiver 50 can be configured to receive signals and direct signals that are received to the processor 40 for further processing. The receiver 50 can be operable to receive transmissions from the network 20 and then communicate the transmissions to the processor 40. The receiver 50 can be an electrical communication element within the processor 40. In some embodiments of the present disclosure, the receiver 50 and the transmitter 48 can be an integral unit.

The transmitter 48 and receiver 50 can communicate over a Wi-Fi network, allowing the head mountable device 14 to exchange data wirelessly (using radio waves) over a computer network, including high-speed Internet connections. The transmitter 48 and receiver 50 can also apply Bluetooth® standards for exchanging data over short distances by using short-wavelength radio transmissions, and thus creating personal area network (PAN). The transmitter 48 and receiver 50 can also apply 3G or 4G, which is defined by the International Mobile Telecommunications-2000 (IMT-2000) specifications promulgated by the International Telecommunication Union.

The head mountable unit 14 can include one or more speakers 52. Each speaker 52 can be configured to emit sounds, messages, information, and any other audio signal to the consumer. The speaker 52 can be positioned within the consumer's range of hearing. Audio content transmitted by the commerce server 12 can be played for the consumer through the speaker 52. The receiver 50 can receive the audio signal from the commerce server 12 and direct the audio signal to the processor 40. The processor 40 can then control the speaker 52 to emit the audio content.

The direction sensor 54 can be configured to generate a direction signal that is indicative of the direction that the consumer is facing. The direction signal can be processed by the processor 40 or by the commerce server 12. For example, the direction sensor 54 can electrically communicate the direction signal containing direction data to the processor 40 and the processor 40 can control the transmitter 48 to transmit the direction signal to the commerce server 12 through the network 20. By way of example and not limitation, the direction signal can be useful in determining the identity of an item(s) visible in the video signal, as well as the location of the consumer within the retail store.

The direction sensor 54 can include a compass or another structure for deriving direction data. For example, the direction sensor 54 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit 14.

The position sensor 56 can be configured to generate a position signal indicative of the position of the consumer within the retail store. The position sensor 56 can be configured to detect an absolute or relative position of the consumer wearing the head mountable unit 14. The position sensor 56 can electrically communicate a position signal containing position data to the processor 40 and the processor 40 can control the transmitter 48 to transmit the position signal to the commerce server 12 through the network 20.

Identifying the position of the consumer can be accomplished by radio, ultrasound or ultrasonic, infrared, or any combination thereof. The position sensor 56 can be a component of a real-time locating system (RTLS), which is used to identify the location of objects and people in real time within a building such as a retail store. The position sensor 56 can include a tag that communicates with fixed reference points in the retail store. The fixed reference points can receive wireless signals from the position sensor 56. The position signal can be processed to assist in determining one or more items that are proximate to the consumer and are visible in the video signal. The commerce server 12 can receive position data and identify the location of the consumer in some embodiments of the present disclosure.

The orientation sensor 58 can be configured to generate an orientation signal indicative of the orientation of the consumer's head, such as the extent to which the consumer is looking downward, upward, or parallel to the ground. A gyroscope can be a component of the orientation sensor 58. The orientation sensor 58 can generate the orientation signal in response to the orientation that is detected and communicate the orientation signal to the processor 40. The orientation of the consumer's head can indicate whether the consumer is viewing a lower shelf, an upper shelf, or a middle shelf.

The accelerometer 60 can be configured to generate an acceleration signal indicative of the motion of the consumer. The acceleration signal can be processed to assist in determining if the consumer has slowed or stopped, tending to indicate that the consumer is evaluating one or more items for purchase. The accelerometer 60 can be a sensor that is operable to detect the motion of the consumer wearing the head mountable unit 14. The accelerometer 60 can generate a signal based on the movement that is detected and communicate the signal to the processor 40. The motion that is detected can be the acceleration of the consumer and the processor 40 can derive the velocity of the consumer from the acceleration. Alternatively, the commerce server 12 can process the acceleration signal to derive the velocity and acceleration of the consumer in the retail store.

The proximity sensor 62 can be operable to detect the presence of nearby objects without any physical contact. The proximity sensor 62 can apply an electromagnetic field or a beam of electromagnetic radiation such infrared and assess changes in the field or in the return signal. Alternatively, the proximity sensor 62 can apply capacitive photoelectric principles or induction. The proximity sensor 62 can generate a proximity signal and communicate the proximity signal to the processor 40. The proximity sensor 62 can be useful in determining when a consumer has grasped and is inspecting an item.

The distance sensor 64 can be operable to detect a distance between an object and the head mountable unit 14. The distance sensor 64 can generate a distance signal and communicate the signal to the processor 40. The distance sensor 64 can apply a laser to determine distance. The direction of the laser can be aligned with the direction that the consumer is facing. The distance signal can be useful in determining the distance to an object in the video signal generated by one of the cameras 42, which can be useful in determining the consumer's location in the retail store.

Figure 3:
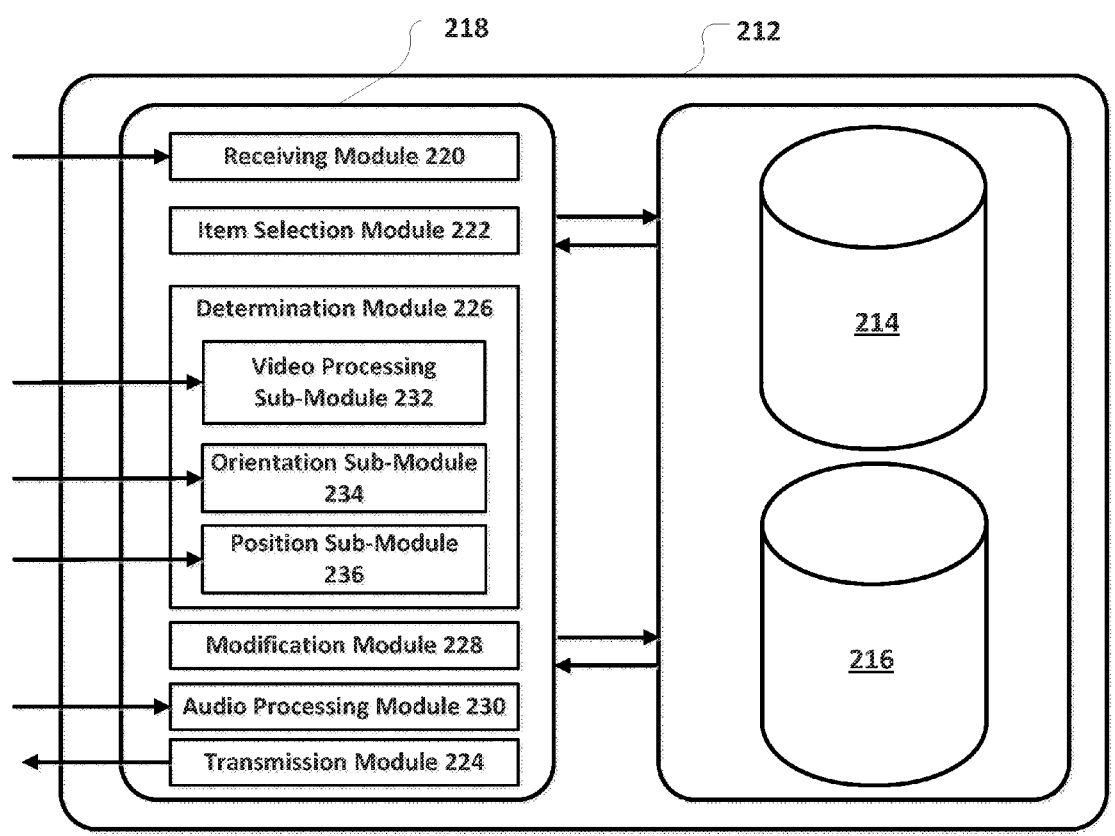
FIG. 3 is an example block diagram illustration a commerce server that can be applied in some embodiments of the present disclosure.

FIG. 3 is a block diagram illustrating a commerce server 212 according to some embodiments of the present disclosure. In the illustrated embodiment, the commerce server 212 can include an item database 214, and a shopping list database 216. The commerce server 212 can also include a processing device 218 configured to include a receiving module 220, an item selection module 222, a transmission module 224, a determination module 226, a modification module 228, and an audio processing module 230. The determination module 226 can include a video processing sub-module 232, an orientation sub-module 234, and a position sub-module 236.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The item database 214 can include in memory the identities of a plurality of items. The plurality of items can be the items offered for sale in a retail store associated with the commerce server 212. The item database 214 can also contain a floor plan of the retail store, including the location of each of the plurality of items within the retail store. The item database 214 can also contain image data for each of the items offered for sale in the retail store. The data in the item database 214 can be organized based on one or more tables that may utilize one or more algorithms and/or indexes.

The shopping list database 216 can include memory containing one or more shopping lists generated by consumers. Each of the shopping lists includes a plurality of items offered for sale in the retail store. Each of the plurality of shopping lists can be correlated to a particular consumer. The data in the shopping list database 216 can be organized based on one or more tables that may utilize one or more algorithms and/or indexes.

The processing device 218 can communicate with the databases 214, 216 and receive one or more signals from the head mountable unit 14. The processing device 218 can include computer readable memory storing computer readable instructions and one or more processors executing the computer readable instructions.

The receiving module 220 can be configured to receive one or more shopping list signals from primary consumer. The receiving module 220 can be operable to receive signals over the network 20 and then communicate the data contained in the signals to other components of the commerce server 212. For example, the receiving module 220 can direct the data contained in shopping list signals that are received from a consumer to the shopping list database 216 to establish a shopping list for a particular consumer.

The item selection module 222 can access shopping lists stored in the shopping list database 216 and can be configured to select an item from the shopping list of a consumer. The item selection module 222 can also access the item database 214 to correlate items on the shopping list with the locations of these items in the retail store. The selected item can be transmitted to the consumer as a reminder of the current item to pursue as the consumer shops.

The item selection module 222 can be configured to select items in the order that the items were added to the shopping list. Alternatively, the item selection module 222 can be configured to select items in an order that minimizes the distance a consumer must travel to acquire all of the items on the shopping list.

The transmission module 224 can be configured to transmit an item signal to the consumer over the network 20. The item signal corresponds to the item from the shopping list selected by the item selection module 222. The transmission module 224 and the item selection module 222 can thus function cooperatively. The item signal can be received by the head mountable unit 14 and result in the item being displayed on the display 46. A visual message resulting from the item signal can be continuously displayed until the item is acquired. Alternatively, the visual message resulting from the item signal can be displayed intermittently as the consumer travels to the location of the item in the retail store.

The determination module 226 can receive one or more signals from the augmented reality device and, in response, determine when an item from the shopping list has been placed in a shopping container, such as a shopping cart or basket. In some embodiments of the present disclosure, the video processing sub-module 232 of the determination module 226 can be configured to receive a video signal from the augmented reality device. The camera 42 can generate a video signal that is transmitted to the commerce server 212. The display 46 of the head mountable unit 14 can overlap the field of view of the camera 42. Thus, the view of the consumer through the display 46 can also define the video signal generated by the camera 42 and communicated to the commerce server 212.

The video processing sub-module 232 can implement known video recognition/analysis techniques and algorithms to analyze the video signal received from the augmented reality device to identify images or portions of images indicative of the placement of an item in a shopping container. For example, the video processing sub-module 232 can identify the consumer's hand positioned within a perimeter of the shopping container. In some embodiments of the present disclosure, indicia can be positioned along at least a portion of a perimeter of the shopping container. Indicia can be positioned along two opposite portions of the perimeter of the shopping container. An image of the consumer's hand disposed between the indicia positioned along the two opposite portions of the perimeter can be indicative of an item being placed in the shopping container. Some embodiments of the present disclosure can be practiced with indicia on more than two portions of the perimeter of the shopping container or without indicia on the perimeter of the shopping container.

The video processing sub-module 232 can also be configured to identify the item placed in the shopping container based on the image data of the item. The video data showing an item being placed in a shopping container can be further analyzed to determine the identity of the item. The video processing sub-module 232 can access the item database 214 and compare image data in the video signal with image data associated with items offered for sale in the retail store. The comparison of the image in the video signal with images in the item database 214 can be limited to only items on the shopping list in some embodiments of the present disclosure.

The orientation sub-module 234 of the determination module 226 can receive the orientation signal from the orientation sensor 58 of the head mountable unit 14. The orientation signal can be generated by the orientation sensor 58 and contain data corresponding to an orientation of the consumer's head. The consumer's head can be oriented downward, upwardly, or generally parallel with the ground. The orientation signal can be applied by the determination module 226 to complement that analysis of the video signal. For example, the orientation sub-module 234 can confirm that the orientation signal indicates that the consumer's head is oriented downwardly when the image of the item being placed in the shopping container is captured.

In some embodiments, the processing device 218 can also include a position module 236. The position module 236 can receive the position signal from the head mountable unit 14. The position signal can be generated by the position sensor 56 and contain data corresponding to a location of the head mountable unit 14 in the retail store. It is noted that the position could be determined in other ways in other embodiments of the present disclosure. The position signal can be applied by the determination module 226 to complement that analysis of the video signal. The item identified by the video processing sub-module 232 can be assessed by the determination module 226 in view of the position of the head mountable unit 14 within the retail store. For example, the determination module 226 can confirm that the item identified by the video processing sub-module 232 is located within the retail store generally proximate to the position of the head mountable unit 14 when the image of the item being placed in the shopping container is captured. Generally, a functional combination of inputs from the gyroscope, accelerometer, compass of the augmented reality device and a clock (not shown but possibly inherent in the commerce server 212 and/or the head mountable unit 14) can track the consumer movements between known landmarks identified by image recognition or other means.

The modification module 228 can be configured to modify a shopping list stored in the shopping list database in response to the operation of the determination module 226. For example, the modification module 228 can modify the shopping list by removing the item placed in the shopping container from the shopping list. The modification module 228 can also function cooperatively with the item selection module 222. For example, the modification module 228 can direct the item selection module 222 to select another item signal to transmit to the head mountable unit when the item associated with the current item signal has been placed in the shopping container.

In some embodiments of the present disclosure, the commerce server 212 can perform a process to confirm that the item determined to have been placed in the shopping container was in fact placed in the shopping container. The modification module 228 can be configured to execute the confirmation function. The modification module 228 can direct the transmission module 224 to transmit a confirmation query to the head mountable unit 14. For example, the confirmation query can be textual and appear on the display 46 or be audible and can be played on the speaker 52.

The consumer can audibly respond to the confirmation query in some embodiments of the present disclosure. The consumer's speech can be captured by the microphone 44 and transmitted to the commerce server 212. The processing device 218 can include an audio processing module 230 to analyze the signal containing the consumer's response to confirmation query. The audio processing module 230 can implement known speech recognition techniques to identify speech in an audio signal, such as a voice message indicating that commerce server has correctly determined that a particular item has been placed in a shopping container.

If the determination module 226 has not correctly determined the identity of the item placed in the shopping container, pursuant to the consumer's response to the confirmation query, the modification module 228 can direct the determination module 226 to repeat the analysis of the video signal and determine another item identity. The modification module 228 can also be configured to prompt the consumer to speak the identity of the item placed in the shopping container in some embodiments of the present disclosure. The audio processing module 230 can implement known speech recognition techniques to identify speech in an audio signal, such as a voice message indicating the identity of the item placed in the shopping container. The modification module 228 can remove the item identified by the audio processing module 230 from the shopping list. A confirmation process is optional to embodiments of the present disclosure.

As set forth above, the modification module 228 can also direct the item selection module 222 to select the next item on the shopping list for transmission to the consumer. The transmission module 224 can change from transmitting the first or current item signal to transmitting a second item signal different from the first item signal in response to the determination that the current item has been placed in the shopping container.

It is noted that the various processing functions set forth above can be executed differently than described above in order to enhance the efficiency of an embodiment of the present disclosure in a particular operating environment. The processor 40 can assume a greater role in processing some of the signals in some embodiments of the present disclosure. For example, in some embodiments, the processor 40 on the head mountable unit 14 could modify the video stream to require less bandwidth. The processor 40 could convert a video signal containing color to black and white in order to reduce the bandwidth required for transmitting the video signal. In some embodiments, the processor 40 could crop the video, or sample the video and display frames of interest. A frame of interest could be a frame that is significantly different from other frames, such as a generally low quality video having an occasional high quality frame. Thus, in some embodiments, the processor 40 could selectively extract video or data of interest from a video signal containing data of interest and other data. Further, the processor 40 could process audio signals received through the microphone 44, such signals corresponding to audible commands from the consumer.

Figure 4A:
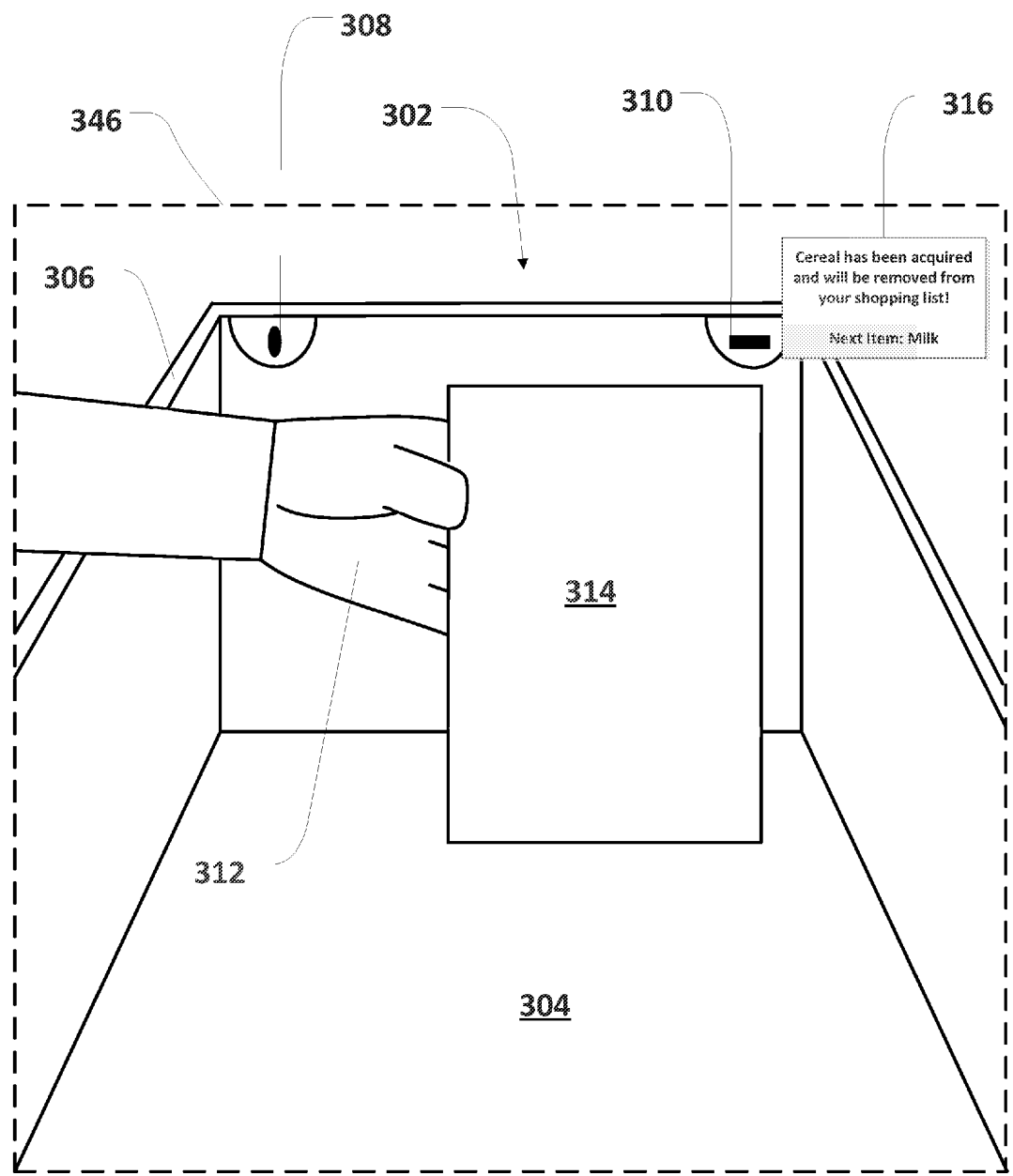
FIG. 4A is an example screen shot of the display visible with the head mountable unit during shopping in some embodiments of the present disclosure.

FIG. 4A is an example screen shot visible through the display 346 during shopping in some embodiments of the present disclosure. The display 346 is partially transparent and the consumer can see a shopping container 302 defining a containing volume 304 and an upwardly-facing perimeter surface 306. The exemplary shopping container 302 can be a shopping cart, but other forms of containers such as baskets can be used in other embodiments of the present disclosure.

Indicia 308 and 310 can be disposed on the shopping container at positions visible to the consumer. The exemplary indicia 308, 310 can be displayed within the containing volume 304 of the shopping container 306. Indicia 308 and 310 can be differently shaped and/or differently colored with respect to one another to promote the likelihood that at least one of the indicia 308, 310 will be detected by the video processing sub-module 232. Further, the indicia 308, 310 can assist in confirming that an image in the video signal in fact reveals the shopping container 302 and not another structure.

In FIG. 4A, the consumer's hand 312 is detectable placing an item 314 in the shopping container 302. An exemplary video processing sub-module according to some embodiments of the present disclosure can detect the respective elements visible in the exemplary display 346, including one or both of the indicia 308, 310, the consumer's hand 312, and the item 314. In response to this detection of elements, the commerce server 212 can determine that the item 314 has been placed in the shopping container 302. Further, the commerce server 212 can modify the consumer's shopping list by removing the item 314 from the consumer's shopping list. A message box 316 can also be visible in the display 346, confirming that the acquisition of item 314 (in this example cereal) has been detected and a subsequent item on the shopping list can be pursued (in this example milk).

Figure 4B:
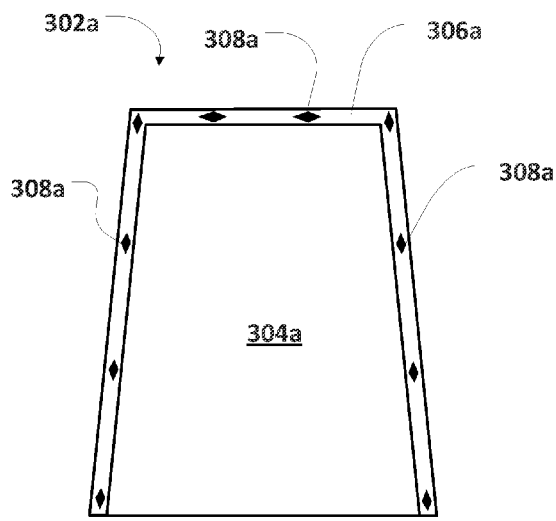
FIG. 4B is a top view of an exemplary shopping container bearing indicia in some embodiments of the present disclosure.

FIG. 4B is a top view of an exemplary shopping container bearing indicia in some embodiments of the present disclosure. A shopping container 302a can define a containing volume 304a. The containing volume 304a can be bounded by a perimeter defined by an upwardly-facing surface 306a. Indica 308a can be disposed around three sides of the containing volume 304a on the upwardly-facing surface 306a, rather than within the containing volume 304 of the embodiment shown in FIG. 4A. The exemplary indicia 308a can be similarly shaped and be the same color, or can be different colors.

Figure 4C:
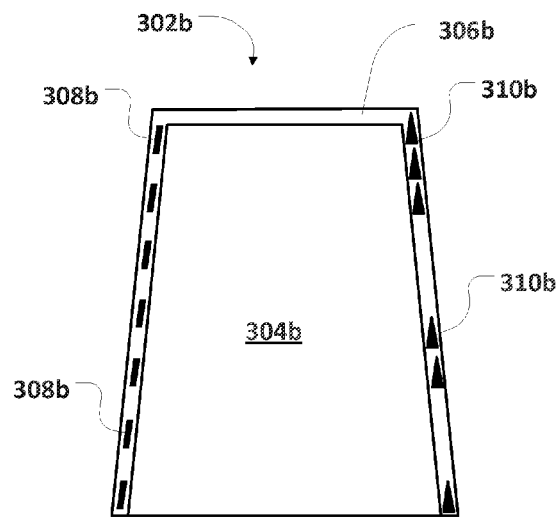
FIG. 4C is a top view of an exemplary shopping container bearing indicia in some embodiments of the present disclosure.

FIG. 4C is a top view of an exemplary shopping container bearing indicia in some embodiments of the present disclosure. A shopping container 302b can define a containing volume 304b. The containing volume 304b can be bounded by a perimeter defined by an upwardly-facing surface 306b. Indicia 308b and 310b can be disposed around opposite sides of the containing volume 304b on the upwardly-facing surface 306b, rather than within the containing volume 304 of the embodiment shown in FIG. 4A. The exemplary indicia 308b can be similarly shaped and be the same color, or can be different colors. Similarly, the exemplary indicia 310b can be similarly shaped and be the same color, or can be different colors. The indicia 308b and 310b can be differently-shaped with respect to one another. The indicia 308b and 310b can also be arranged in different patterns with respect to one another.

Figure 5:
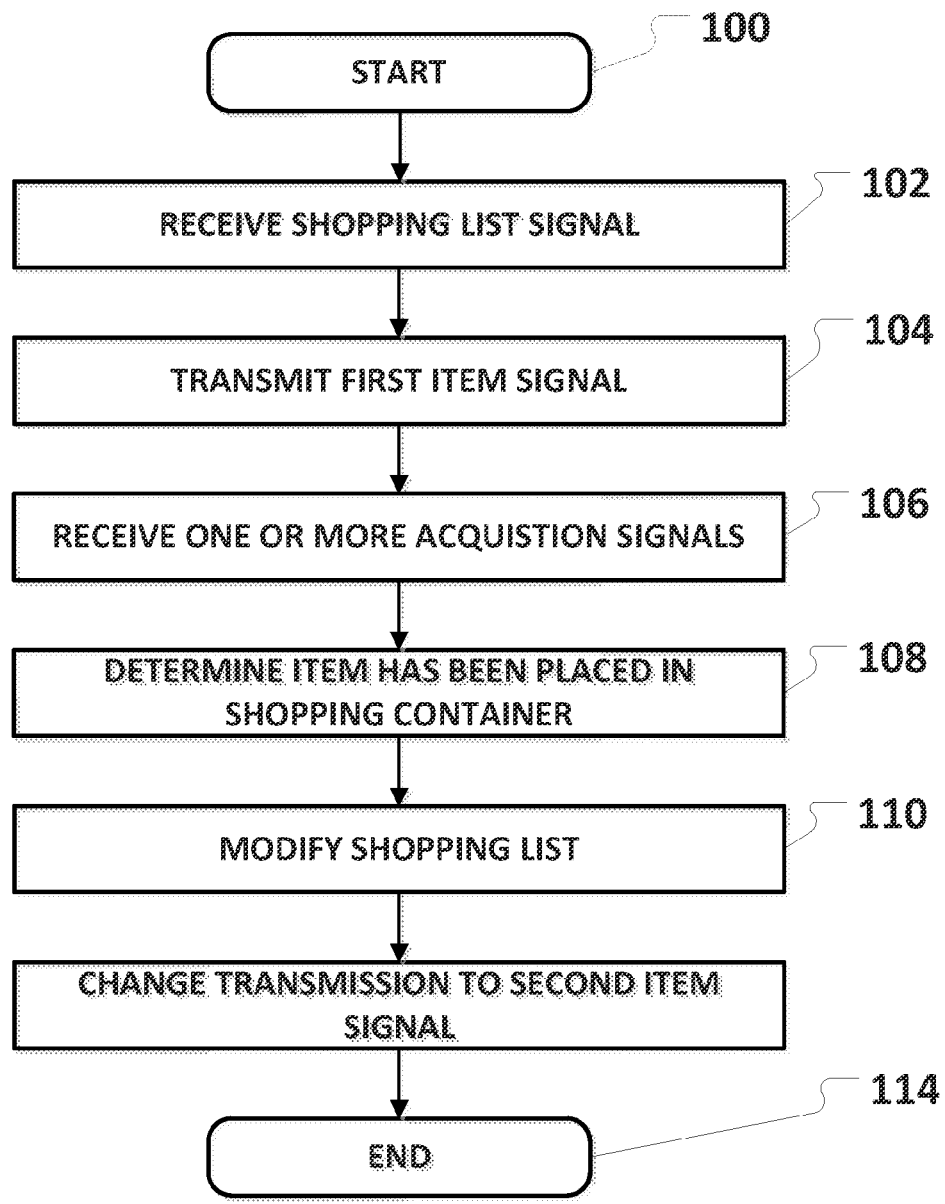
FIG. 5 is an example flow chart illustrating a method that can be carried out according to some embodiments of the present disclosure.

FIG. 5 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 5 is a flow chart illustrating a method that can be carried out in some embodiments of the present disclosure. The method can be executed by a commerce server. The commerce server can be located at the retail store or can be remote from the retail store. The method starts at step 100. At step 102, the commerce server can receive one or more shopping list signals from an electronic computing device to establish a shopping list of a plurality of items offered for sale in a retail store.

At operation 104, the commerce server can transmit a first item signal to an augmented reality device worn by a consumer within the retail store. The first item signal corresponds to one of the plurality of items. The first item signal can result in the identity of the item being displayed on a display of the augmented reality device. Operation 104 is optional and not required of embodiments of the present disclosure.

At step 106, the commerce server can receive one or more acquisition signals from the augmented reality device worn by the consumer. At step 108, the commerce server can determine that an item from the shopping list has been placed in a shopping container based on the one or more acquisition signals received from the augmented reality device in step 106.

At step 110, the commerce server can modify the shopping list. For example, the item placed in the shopping container can be removed from the shopping list. At operation 112, the commerce server can change the transmission of the item signal from transmitting the first item signal to transmitting a second item signal different from the first item signal. The change is in response to the placement of the first or current item in the shopping container. The exemplary process ends at step 114.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented method comprising:
   receiving, with a processing device of a commerce server, one or more shopping list signals from an electronic computing device;
   establishing a shopping list of a plurality of items offered for sale in a retail store according to the shopping list signals;
   receiving, with the processing device, one or more signals from an augmented reality device worn by a consumer as the consumer shops in the retail store, the one or more signals from the augmented reality device including video data from one or more cameras associated with the augmented reality device;
   determining, with the processing device, that the video data includes all of an image of the customer's hand, an image of an item of the plurality of items, perimeter markings on a shopping cart, and the customer's hand and the image of the item are both positioned between the perimeter markings on the shopping cart;
   identifying, by the processing device, the item placed in the shopping container based on the image of the item;
   confirming, by the processing device, that the item identified is located within the retail store generally proximate to a position of the augmented reality device when the image of the item being placed in the shopping container is captured; and
   in response to: (1) determining that the video data includes all of the image of the customer's hand, an image of an item of the plurality of items, perimeter markings on the shopping cart, and the customer's hand and the image of the item both positioned between the perimeter markings on the shopping cart, (2) identifying, by the processing device, the item placed in the shopping container based on the image of the item, and (3) confirming, by the processing device, that the item identified is located within the retail store generally proximate to a position of the augmented reality device when the image of the item being placed in the shopping container is captured, modifying, with the processing device, the shopping list to indicate retrieval of the identified item of the plurality of items.

2. The computer-implemented method of claim 1 wherein said determining step further comprises:
   analyzing, with the processing device, the video signal to identify indicia positioned along three sides of a polygonal perimeter of a shopping container.

3. The computer-implemented method of claim 1 wherein:
   said step of receiving one or more signals from the augmented reality device further comprises receiving an orientation signal from the augmented reality device, the orientation signal indicating an orientation of the augmented reality device; and
   said determining step further comprises determining that an item from the shopping list has been placed in the shopping container in response to both of the video signal and the orientation signal.

4. The computer-implemented method of claim 3 wherein said determining step further comprises:
   confirming, with the processing device, that the orientation signal corresponds to a downward orientation of the consumer's head.

5. The computer-implemented method of claim 1 further comprising:
   transmitting, with the processing device, a confirmation query signal to the augmented reality device after said determining step and before said modifying step.

6. The computer-implemented method of claim 5 further comprising:
   receiving, with the processing device, a confirmation acknowledgement signal from the augmented reality device, wherein said modifying step is executed in response to said step of receiving the confirmation acknowledgement signal.

7. The computer-implemented method of claim 1 wherein said modifying step further comprises:
   modifying the shopping list by removing the item placed in the shopping container from the shopping list.

8. The computer-implemented method of claim 1 further comprising:
   transmitting, with the processing device, a first item signal to the augmented reality device wherein the first item signal corresponds to one of the plurality of items on the shopping list.

9. The computer-implemented method of claim 8 further comprising:
   changing, with the processing device, from transmitting the first item signal to transmitting a second item signal different from the first item signal in response to said determining step.

10. A consumer shopping list system comprising:
    a shopping list database; and
    a commerce server having a processing device including:
       a receiving module configured to receive both of (a) one or more shopping list signals from an electronic computing device to establish a shopping list of a plurality of items offered for sale in a retail store wherein the shopping list is stored in said shopping list database and (b) video data from one or more cameras associated with an augmented reality device;

a determination module configured:
  to determining that the video data includes all of an image of the customer's hand, an image of an item of the plurality of items, perimeter markings on a shopping cart, and the customer's hand and the image of the item are both positioned between the perimeter markings on the shopping cart,
  to identifying the item placed in the shopping container based on the image of the item, and
  to confirming that the item identified is located within the retail store generally proximate to a position of the augmented reality device when the image of the item being placed in the shopping container is captured; and a modification module configured to, in response to: (1) determining that the video data includes all of the image of the customer's hand, an image of an item of the plurality of items, perimeter markings on the shopping cart, and the customer's hand and the image of the item both positioned between the perimeter markings on the shopping cart, (2) identifying the item placed in the shopping container based on the image of the item, and (3) confirming that the item identified is located within the retail store generally proximate to a position of the augmented reality device when the image of the item being placed in the shopping container is captured, modify the shopping list to indicate retrieval of the identified item of the plurality of items.

11. The consumer shopping list system of claim 10 wherein the processing device further comprises:
  an item selection module configured to select an item from the shopping list; and
  a transmission module operable to transmit an item signal containing the item selected by said item selection module to an augmented reality device worn by a consumer in a retail store.

12. The consumer shopping list system of claim 10 wherein the determination module further comprises:
  an orientation sub-module configured to receive an orientation signal from the augmented reality device; and
  a position sub-module configured to receive a position signal from the augmented reality device.

13. The consumer shopping list system of claim 10 wherein the processing device further comprises:
  an audio processing module configured to receive an audio signal from an augmented reality device worn by a consumer shopping in a retail store and determine if the audio signal contains verbal messages.

14. The consumer shopping list system of claim 10 further comprising:
  at least one shopping container defining a containing volume and an upwardly-facing perimeter surface, wherein the perimeter markings are disposed along at least a portion of said upwardly-facing perimeter surface.

15. The consumer shopping list system of claim 14 wherein the perimeter markings include a first type of indicia disposed along a first portion of said upwardly-facing perimeter surface and a second type of indicia disposed along a second portion of said upwardly-facing perimeter surface, wherein said first type of indicia is different than said second type of indicia and said first and second portions are on opposite sides of said containing volume.

* * * * *